May 29, 1962  R. B. WIPRUD  3,037,163
APPARATUS FOR DETECTING A FAULT IN WEB MATERIAL
Filed Oct. 2, 1957
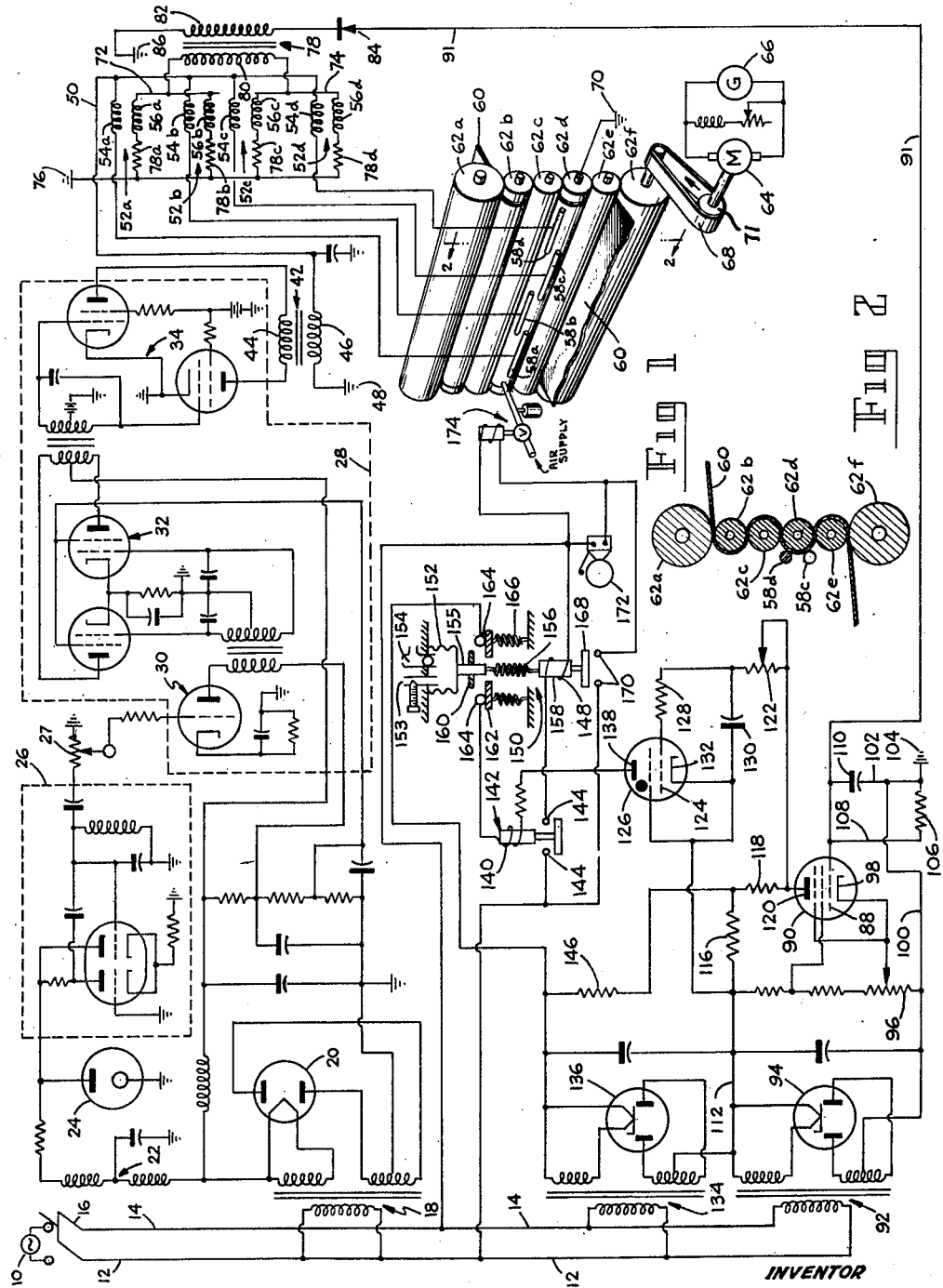
INVENTOR
ROY B. WIPRUD
BY
Stuart R. Peterson
ATTORNEY

United States Patent Office 3,037,163
Patented May 29, 1962

3,037,163
APPARATUS FOR DETECTING A FAULT
IN WEB MATERIAL
Roy B. Wiprud, Minneapolis, Minn.
(280 Park Blvd., Glen Ellyn, Ill.)
Filed Oct. 2, 1957, Ser. No. 687,749
1 Claim. (Cl. 324—54)

This invention relates generally to the testing of dielectric material and pertains more particularly to apparatus for detecting the presence of faults in a moving web of paper.

One object of the invention is to provide apparatus capable of performing fault detecting operations in a sheet or web of dielectric material as it travels past a plurality of electrodes. More specifically, it is an aim of the invention to apply an alternating potential to a pair of electrodes, one electrode being on each side of the moving material, so as to produce a predetermined amount of capacitive reactance in the circuit for a given homogeneity of the material. When a fault, such as a hole, appears between the electrodes, there is an electrical breakdown owing to the applied voltage which is primarily resistive in character. Thus, while the voltage directly across the electrodes may be leading the current by approximately 90° when there is no fault, the electrodes and dielectric material under faultless conditions forming what amounts to an electrical capacitor, the breakdown caused by a fault will result in the voltage and current becoming more in phase with each other. The present invention provides suitable means for sensing when there has been a predetermined phase change between the applied voltage and the current produced thereby. In this way, various faults, particularly holes, may be effectively and efficiently located.

Another object of the invention is to obviate the need for having any physical contact between the electrodes at any time.

A further object is to provide apparatus of the above nature in which the impressed voltages at several different locations will be balanced against each other, a change in voltage due to a fault at any one location being sufficient to actuate the circuitry and thereby indicate the presence of that fault. Thus, the apparatus can be made quite sensitive in its hole detecting role as long as the applied voltage is sufficient to cause a breakdown when a fault is encountered.

Still another object of the invention is to render my system insensitive to minor faults and inconsistencies in quality or thickness of the material undergoing test. In this way the apparatus can be adjusted so as to disregard faults that are acceptable for a given grade of material.

Yet another object is to provide apparatus that can be readily incorporated into existing equipment utilizing processing rolls, a paper mill being an excellent example. Thus, a plurality of electrodes can be utilized in association with one of the processing rolls so that gradual variations in the diameter of the processing roll when used as a common electrode will not adversely affect the operation of the apparatus.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claim.

FIGURE 1 is a schematic diagram of one embodiment the invention may assume, and

FIGURE 2 is a sectional detail taken in the direction of line 2—2 of FIGURE 1.

Referring now in detail to FIGURE 1 the circuitry there selected to illustrate the invention includes a 60 cycle, 120 volt A.-C. source 10 connectable to a pair of bus conductors 12, 14 via a switch 16. A first transformer 18 supplies A.-C. power to a full-wave rectifier tube 20. In circuit with the tube 20 is a filter 22 and a constant voltage regulating tube 24. The filter 22 and tube 24 furnish a substantially non-pulsating constant voltage to an audio oscillator denoted by the numeral 26. For purposes of the present invention the oscillator 26 generates a 4,000 cycle voltage signal which is fed via a potentiometer 27 to a three-stage amplifier 28 comprising first, second and third transformer coupled amplifying sections 30, 32 and 34, respectively. The plate supply and grid bias voltages for the amplifying sections are conventionally derived and need not be described in detail.

A transformer 42 has its primary winding 44 connected in the output circuit of the third amplifier stage 34 and has its secondary winding 46 connected between ground at 48 and a conductor 50. The conductor 50 furnishes a 4,000 cycle, A.-C. voltage, in the exemplified instance, to a plurality of transformers 52a, 52b, 52c and 52d. These transformers include primary windings 54a, 54b, 54c, 54d and secondary windings 56a, 56b, 56c, 56d. The primary windings are in effect commoned at one end inasmuch as all of their corresponding ends are connected directly to the conductor 50. The opposite ends of the primary windings are connected to a group of metallic electrodes 58a, 58b, 58c and 58d.

At this time it will be assumed that it is desired to detect holes in dielectric material which is in the form of a moving web or sheet of dry paper 60. For the sake of illustration it will be further assumed that the paper 60 has left the drier and is now being subjected to a calendering operation, although it will be appreciated that in making some types of paper the calender stack is by-passed, the paper then going directly to the reel. In such instances, that is where the calender stack is by-passed, a special roller may be employed in carrying out the teachings of the invention. Since it has been presumed that a calendering step is desired, a stack of calendering rolls 62a, 62b, 62c, 62d, 62e, 62f is pictured in perspective in FIGURE 1 and in sectional elevation in FIGURE 2. As is usual, only the bottom roll 62f need be driven. To accomplish this, a motor 64 supplied with power from a generator 66 is employed, the motor driving a belt 68 entrained over a pulley 71 mechanically coupled to the roll 62f.

Any of the rolls 62 may be employed as an electrode cooperable electrically with the plurality of hereinbefore mentioned electrodes 58. Having selected the roll 62d as the electrode, it should be pointed out that this electrode 62d is grounded at 70. Actually, it is contemplated that each of the electrodes 58 be in the form of rolls suitably insulated from each other and on a common support or yoke that can be pivotally moved as a unit into operating position.

Attention is directed at this time to FIGURE 2 where the sectional view there presented shows that the electrode 58d (and the electrode 58c as well as the other electrodes which do not appear in this view) are engaging the paper 60. The capacitance role played by the electrodes 58d and 62d is determined by the length and diameter of the electrodes and the thickness of the dielectric (the paper 60 in the illustrated instance) between the electrodes. Physical contact between these electrodes is not necessary to carry out their intended purpose of automatic inspection.

It will be readily discerned that the winding 54a, the electrode 58a and the electrode 62d form one electrical path, the winding 54a furnishing a certain amount of inductive reactance and the electrodes 58a and 62d together with the intervening paper 60 then between said electrodes supplying a certain amount of capacitive reactance for a given homogeneity of paper and at the selected 4,000 cycle frequency. A second electrical path is provided by the winding 54b, the electrode 58b and the electrode 62d. Similarly, third and fourth paths are provided which include the electrodes 58c and 58d, respectively. These four circuit paths are all in parallel with each other as is apparent from FIGURE 1.

Now specific reference will be made to the four secondary windings 56a, 56b, 56c and 56d and the circuitry associated therewith. It will be noted that one end of the windings 56a, 56b are joined together by a short conductor 72 and that the corresponding ends of the windings 56c, 56d are similarly joined by a conductor 74. The opposite ends of the windings 56a, 56b, 56c, 56d are connected to ground at 76 via resistors 78a, 78b, 78c, 78d. Any electrical unbalance between any two of the secondary windings 56a, 56b, 56c or 56d is sensed by a transformer 78 having its primary winding 80 connected between the conductors 72 and 74. The secondary winding, labeled 82, of the transformer 78 is connected between a half-wave rectifier 84 and ground at 86.

The rectifier 84 is connected directly to the control grid 88 of a sharp cut-off pentode tube 90, for instance, a 6SJ7 vacuum tube by means of a conductor 91. The purpose of tube 90 is to equalize variations in the voltage between rolls 58a, 58b, 58c or 58d and 62d during a fault condition so that the change in voltage between the cathode and grid in tube 126 (later described) will be the same for all types of faults making the time delay circuit (hereinafter referred to) and the size of the fault detected completely uniform. To supply the plate voltage and grid bias to the tube 90, a transformer 92 is employed, being in circuit with a full-wave rectifier tube 94. By reason of a potentiometer 96 the grid 88 of the tube 90 is maintained at a slightly more negative potential than its cathode 98 so that the vacuum tube 90 will be normally conductive. The circuit from the potentiometer 96 to grid 88 includes a conductor 100 joined to a conductor 102 leading to ground at 104. The circuit also includes a resistor 106 connected to the conductor 102 (and hence to ground 104) and a conductor 108 leading from said resistor 106 to the grid 88 by way of its juncture with the conductor 91. Consequently, when there is no current flowing through the resistor 106 the grid is at ground potential due to the ground connection at 104. As will be made manifest during a subsequently presented operational sequence, the resistor 106 carries current during a fault so that the grid bias is changed to a value considerably negative relative to the cathode 98 to stop conduction of the tube 90. Attention is also directed to the presence of a capacitor 110 connected to the grid 88 via the conductor 91 and to ground 104 via the conductor 102. Its role will likewise be clarified during the ensuing operation.

As already stated, the tube 90 receives its plate supply from the rectifier tube 94. Included in this particular circuit is a conductor 112 and resistance sections 116 and 118, the latter being connected to the plate 120.

Connected between the resistor 118 and the plate 120 is one end of an adjustable resistor or rheostat 122. The other end of the rheostat 122 is connected to the grid 124 of a gas filled thyratron tube 126 through a resistor 128. This same other end of the rheostat 122 is also attached to one side of a capacitor 130, the other side of the capacitor being connected to the cathode 132 of the gas tube 126. Furnishing the plate voltage for the tube 126 is a transformer 134 connected to a full-wave rectifier tube 136. In series with the rectifier tube 136 and the plate 138 of the gas tube 126 is the operating coil 140 of an instantaneous relay denoted by the numeral 142. When the tube 126 fires, the relay 142 will pick up to close its normally open contacts 144. Aiding in the triggering of the gas tube 126 is a resistor 146, the specific duty of which will be more fully explained later in conjunction with a typical operation description. At this time, though, it is to be observed that the resistor 146 provides an electrical path containing the resistor 116 and the rectifier tube 136, since said resistor 146 is connected to the juncture of the resistors 116, 118.

Having referred to the normally open contacts 144, it will now be explained that the operating coil 148 of a relay 150 is under the influence of these contacts, closure thereof connecting said coil across the bus conductors 12, 14. The relay 150 is a combination instantaneous and time delay type, there being a resilient bellows 152 having its upper side fixed and provided with a needle valve controlled orifice 153 that bleeds air into the bellows at a relatively slow rate and a one way ball check or poppet valve 154 that releases air quickly, a rod 155 attached thereto and a spring 156 with the lower end of said spring 156 being affixed to the relay's core 158. An integral collar 160 on the rod 155 in cooperation with an apertured bridge contact element 162 introduces a time delay action to the opening of a pair of contacts 164 after energization of the coil 148 due to the orifice 153. Immediate reset of the time delay contacts are obtained by the restorative action of the bellows and the one way poppet valve 154 when coil 148 is de-energized. The bridging element 162 is normally urged upwardly to close the contacts 164 by reason of a pair of small biasing springs 166. However, the relay 150 is equipped with a second bridge contact element 168 that moves in unison with the core 158 to immediately close a pair of normally open contacts 170. The contacts 164 are in series with the plate 138 of the gas tube 126 so the relay 142 is actually picked up through these normally closed contacts when the tube 126 fires. The normally open contacts 170, on the other hand, are in circuit with an alarm, such as an electric bell 172, and a solenoid actuated valve mechanism 174 for applying a liquid marking medium to one marginal edge of the paper 60, thereby visibly marking the paper adjacent to where a fault has been detected.

Having in mind the construction and arrangement of the principal elements thereof, it is believed that a complete understanding of my invention may now be had from a description of the operation. With the switch 16 closed, the oscillator generates a 4,000 cycle signal at a constant voltage across potentiometer 27. The potentiometer is adjusted to produce a certain amplified voltage in the secondary 46 of transformer 42. This voltage is sufficient to produce a current of a certain value through the four parallel paths of transformer primaries 54a, 54b, 54c, 54d and the capacitors formed by electrodes 58a, 58b, 58c, 58d, the dielectric 60 and roll 62d to ground. The value of this current should be such as to develop a voltage across the said capacitor of such a magnitude that it will break down a film of air the thickness of the dielectric but not large enough to break down the dielectric itself. In the present illustration a voltage of approximately 600 volts was used with paper .003 inch thick.

Although slight voltage unbalances may occur in the system to cause circulating currents of small magnitude to flow in the winding 80, the bias impressed upon the grid 88 is such as to ignore the resulting minor voltage swings induced in the secondary winding 82. Thus while the vacuum tube 70 is normally conducting, the biasing action of the grid not being sufficient to cause cut off, the added negative D.-C. bias produced via the half-wave rectifier under these assumed transient conditions will still not be enough to effect cut off.

Now, supposing that a hole in the paper 60 moves between any one of the staggered electrodes 58 and the electrode or roll 62d, say between the electrode 58a and said roll 62d, it follows that there will be an electrical breakdown. Since the applied voltage is approximately 600 volts, it will be more than ample to cause such a breakdown through the intervening air. With a constant voltage applied between conductor 50 and ground 48 any change in the potential prevailing between the electrodes 58a and 62d due to the fault will be reflected in a voltage change across the primary winding 54a, resulting in a change in secondary voltage provided by the winding 56a. This will create a difference in potential between conductors 72 and 74 with a concomitant flow of current through the primary winding 80. As a result, an appreciable voltage is generated in the secondary winding 82 which by reason of the half-wave rectifier is instrumental in making the bias on the grid 88 so negative that the tube 90 cuts off. Normally the grid 88 is at ground potential, being connected to ground at 104.

Before presenting the remainder of the operational sequence, it should be understood that the invention does not rely exclusively upon a change in potential magnitude across any of the electrodes 58a, 58b, 58c or 58d and the electrode 62d. In this regard the invention makes use of the fact that there occurs a change in phase relation between the voltage applied across the electrodes 58a and 64d and the current passing between these electrodes when a fault occurs. Thus, instead of the current leading the voltage by about 90°, it leads at a lesser angle by virtue of the resistive path introduced by the breakdown. This phase change is reflected through the transformer 52a into its secondary winding 56a. In this way the substantially balanced relationship previously existing in the windings 56a, 56b, 56c and 56d is upset and a current therefore courses through the primary winding 80 to swing the bias of the grid 88 so far negative as to cut off the vacuum tube 90, which up to the time that the fault arrived was conducting.

Through the voltage divider action produced by the resistance sections 116 and 118 in conjunction with the resistor 146, when the vacuum tube 90 stops conducting there is an abrupt rise in voltage at the plate 120. The adjustable resistor or rheostat 122 in cooperation with the capacitor 130 provides a time delay, these components delaying the build up of a positive voltage on the grid 124 which would be of ample magnitude to trigger the gas tube 126. Such time delay or time constant circuitry is old and well known and need not be fully described here other than to say that the time delay period is rendered variable by the rheostat 122. Stated somewhat differently, the delay is selected so that a hole in the paper 60 having dimensions smaller than those which would be deemed objectionable for the grade of paper being manufactured will not produce a firing of the gas tube 126. The speed of the paper 60, somewhere in the neighborhood of 1,100 feet per minute must be taken into account in determining the delay period.

Since the delay period is usually longer than the period for one cycle (we have assumed a frequency of 4,000 cycles per second), it is imperative that the vacuum tube 90 not begin conducting again before the end of the delay period. This is the function of the capacitor 110, for it is capable of storing a negative pulse produced by a fault for a time greater than one-half cycle. By this time a second negative pulse will be received, assuming that a fault persists for a long enough interval.

Once the gas tube 126 fires, the relay 142 will immediately pick up through the normally closed contacts 164, since its operating coil 140 is serially connected in the plate circuit of the tube 126. Next in the sequence of events is the energization of the operating coil 148 of the relay 150. This stems from the fact that the coil 148 is in circuit with the contacts 144. The closure of the contacts 168 energizes the bell 172 and simultaneously actuates the valve mechanism 174 to mark the paper 60 where the fault exists. By virtue of the time delay feature, the contacts 164 are not immediately opened. This imparts a delay to the dropping out of the relay 142 inasmuch as the operating coil 140 is in series with these contacts 164. This provides a period of time so that the sound of the bell 172 may be heard and also so that the mark made by the mechanism 174 will be of discernible length. However, when the contacts 164 do open to de-energize the relay 142 the contacts 144 immediately open to interrupt the flow of current to the operating coil 148 of the relay 150, the bell 172 ceases to ring and the mechanism 174 is inactivated. Through this arrangement the grid 124 of the tube 126 regains control of this tube's firing.

From the foregoing description it will be apparent that a fault passing between any one of the electrodes 58a, 58b, 58c or 58d and the electrode 62d common to these electrodes will set off the signal devices 172 and 174. Since where uniform density of material exists, the system will be in substantial balance; a fault, such as a hole, destroys the homogeneous effect and upsets the balance.

As many changes could be made in the above construction and other different embodiments of the invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

What is claimed:

Apparatus for detecting a hole fault in a web of dielectric material comprising first and second electrodes, a third electrode associated with said first and second electrodes, means for passing the material to be tested over a portion of said third electrode and in a proximal relation with said first and second electrodes, first electrical means in circuit with said first and third electrodes for producing an A.-C. signal having a certain voltage to current phase relationship influenced by the homogeneity of material residing between said first and third electrodes, second electrical means in circuit with said second and third electrodes for producing an A.-C. signal having a voltage to current phase relationship substantially similar to said first-mentioned phase relationship when material of substantially the same homogeneity is residing between said second and third electrodes, and comparison means responsive to each of said A.-C. signals for sensing when a predetermined disparity in said phase relationships has occurred caused by a sufficient change in homogeneity of material due to a hole between either said first and third or said second and third electrodes.

References Cited in the file of this patent

UNITED STATES PATENTS

| 2,220,489 | Lowkrantz | Nov. 5, 1940 |
| 2,631,188 | Clapp | Mar. 10, 1953 |
| 2,659,048 | Zabel et al. | Nov. 10, 1953 |
| 2,712,112 | Weeks | June 28, 1955 |
| 2,782,367 | Dallas | Feb. 19, 1957 |
| 2,906,950 | Ichijo | Sept. 29, 1959 |
| 2,939,077 | Branin | May 31, 1960 |

FOREIGN PATENTS

| 826,468 | Germany | Jan. 3, 1952 |
| 835,311 | Germany | Mar. 31, 1952 |